Oct. 9, 1951  S. M. MERCIER  2,570,364
SELF-ALIGNING BELT IDLER
Filed Nov. 1, 1948
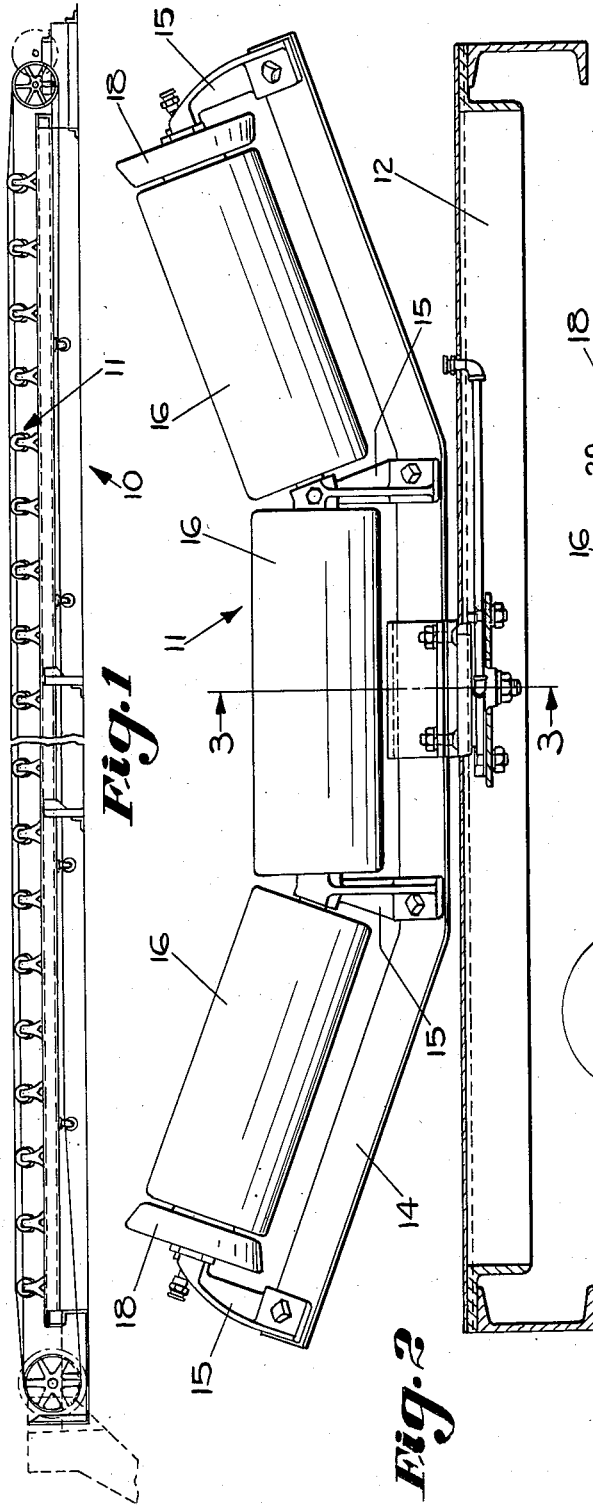
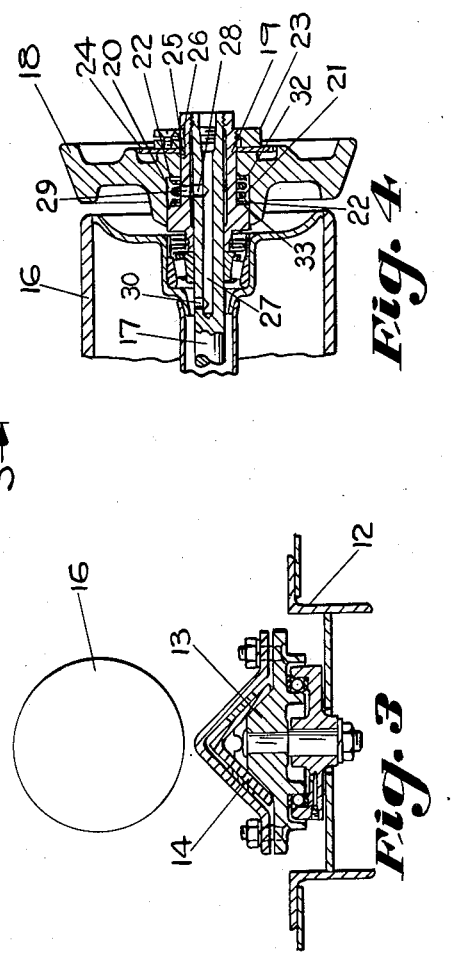
INVENTOR;
STANLEY M. MERCIER,
BY
ATT'Y.

Patented Oct. 9, 1951

2,570,364

UNITED STATES PATENT OFFICE 2,570,364

SELF-ALIGNING BELT IDLER

Stanley M. Mercier, Bexley, Ohio, assignor to The Jeffrey Manufacturing Company, a corporation of Ohio Application November 1, 1948, Serial No. 57,666

4 Claims. (Cl. 198—202)

This invention relates to a self-aligning belt idler and an object of the invention is to provide an improved, simple and efficient device of this type.

Other objects of the invention will appear hereinafter, the novel features and combinations being set forth in the appended claims.

In the accompanying drawings,

Fig. 1 is a side elevational view of a conveyor including one or more self-aligning belt idlers of my invention;

Fig. 2 is a transverse sectional view through the conveyor of Fig. 1, showing particularly one of the self-aligning belt idlers in elevation;

Fig. 3 is a section on the line 3—3 of Fig. 2, with the idler roller only diagrammatically illustrated; and Fig. 4 is a sectional view showing an outer end of one of the troughing idlers and a heavy frictional aligning idler.

A great many attempts have been made to provide a simple and efficient self-aligning belt idler assembly. Many of these have been successful to an appreciable extent, others quite unsuccessful. Some of the most successful ones are complicated in construction or difficult and expensive to maintain. The prior known self-aligning belt idlers all leave something to be desired, either on the score of simplicity, maintenance, cost, or efficiency of operation. The self-aligning idler of the present invention is believed to represent an improvement in the overall picture, as compared with any prior art devices, though it is appreciated that in its general arrangement it is patterned to some extent along the lines of known prior art devices.

In Fig. 1 of the drawings there is illustrated a conveyor 10 which includes a plurality of upper troughing belt idler assemblies 11, some but preferably not all of which are of the self-aligning type. One of the idler assemblies 11 is seen in Fig. 2 of the drawings and includes a supporting frame 12 which extends between the longitudinal channel members of the conveyor 10 and is supported thereby.

At its center the supporting frame 12 is provided with a pivot joint 13 which carries a troughing frame 14, thereby supporting said troughing frame 14 for pivotal movement on an upright axis. The troughing frame 14 carries a plurality of spaced brackets 15 which support three idler rolls 16. The idlers or rolls 16 are mounted on stationary shafts 17, the ends of which are supported in the brackets 15. The shafts 17 which support the two outer idlers or rolls 16 are inclined to the horizontal, thus providing for the troughing of the belt of conveyor 10.

Adjacent the outer end of each outer idler roll 16 is a friction roll 18 which has a relatively narrow frusto-conical rim, the smaller periphery of which is closely adjacent the outer edge of the adjacent idler roll 16 and has substantially the same diameter as the diameter of said adjacent idler roll. The friction roll 18 is preferably made relatively heavy, as compared with the hollow idler roll 16. For example, said friction roll 18 may be made of cast iron.

Friction roll 18 is rotatably mounted on a bushing 19 which in turn is threaded to and thus rigidly attached with shaft 17. The bushing 19 is so constructed in cooperation with the hub of the friction roll 18 as to provide a peripheral cavity or chamber 20 within which a helical spring 21 is contained between pressure washers 22, there being a washer 22 on each side of said spring 21.

Threaded and locked to the outer end of the bushing 19 is a large nut 23 which cooperates with a pressure disc 24, a portion of the outer surface of which bears against the inner surface of the nut 23, and the inner surface of which in turn bears against an adjacent surface of the hub of friction roll 18.

Pressure disk 24 includes an ear, tab or key 25 that extends radially inwardly into a groove or keyway 26 in the bushing 19 which prevents rotation of the disk 24 with respect to the bushing 19 and nut 23. As set forth above the spring 21 and washers 22 are contained within the chamber 20. The washers 22 bear upon the spaced opposed walls 32 and 33 of the chamber 20 formed by the friction roll 18 and the bushing 19 respectively. Lubricant is fed to chamber 20 through a central bore 27 in shaft 17 and a radial bore 28 formed in the shaft 17 in alignment with a bore 29 in the bushing 19 that leads to the chamber 20. A radial bore 30 in shaft 17 extends from adjacent the innermost end of bore 27 outwardly to a lubricant conducting tube 31 that distributes grease to the bearings that support the idler roll 16.

It will be seen that because the spring 21 and washers 22 are housed in the chamber 20 which contains lubricant that friction between the washers 22, the bushing 19 and friction roll 18 will be reduced to a minimum and that substantially all of the braking effect applied to the friction roll 18 will be by reason of the friction between the roll 18 and the pressure disk 24.

From the above description it is evident that the friction roll 18 can rotate on the bushing 19 but that it is normally held against rotation by the friction between the roll 18 and the stationary nut 23 as transmitted through the disc 24. This friction is created by the presence of the coil spring 21 which urges the parts into frictional engagement. The degree of this friction may be adjusted by adjusting the position of the nut 23 on the shaft 17 and locking it in any desired position.

In the operation of the device the trough belt will normally be supported by the idler rolls 16. Should it tend to come out of alignment it will travel to one side or the other and contact one of the friction rolls 18. In the first place, the weight of the friction roll 18 will create friction between the belt and the pivoted idler assembly. In addition, even after the roll 18 is rotated there will be appreciable frictional drag on the belt, due to the substantially uniform frictional drag provided by the brake mechanism above described. This will tend to swing the self-aligning belt assembly about the upright axis of the pivot joint 13 with the resulting re-alignment of the belt in a manner which is well understood in this art.

It is evident that the parts provided are quite simple as well as adjustable so that the amount of frictional drag can be readily changed if found desirable. Furthermore, there is a complete absence of any operating levers or engaging or disengaging brakes or drags which is common with many of the prior art self-aligning mechanisms. Thus parts which are subject to wear are very simple, being principally the disc 24 and are very readily replaceable. The efficiency of the unit, that is its ability to perform its intended function, has been found to be quite satisfactory and this coupled with its simplicity and adjustability result in a relatively inexpensive design.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. Idler roll training mechanism including in combination a shaft adapted to be carried stationarily upon a pivotally carried frame, an idler roll and a friction roll carried side by side upon said shaft, bearing means supporting said idler roll upon said shaft for free rotation, a bushing on said shaft carrying said friction roll for rotation, said bushing and friction roll cooperating to form a chamber between them adapted to contain lubricant and having spaced end walls, spring means in said chamber extending between said opposed walls urging said friction roll axially along said shaft and away from said idler roll, a nut on said shaft, and a friction disc interposed between said nut and said friction roll against which said spring means urges said friction roll.

2. Idler roll training mechanism including in combination a shaft adapted to be carried stationarily upon a pivotally carried frame, an idler roll and a friction roll carried side by side upon said shaft, bearing means supporting said idler roll upon said shaft for free rotation, a bushing on said shaft carrying said friction roll for rotation, said bushing and friction roll cooperating to form a chamber between them adapted to contain lubricant and having spaced end walls, spring means in said chamber extending between said opposed walls urging said friction roll axially along said shaft and away from said idler roll, and friction disk means carried upon said shaft against which said spring means urges said friction roll.

3. Idler roll training mechanism including in combination a shaft adapted to be carried stationarily upon a pivotally carried frame, an idler roll and a friction roll carried side by side upon said shaft, bearing means supporting said idler roll upon said shaft for free rotation, a bushing on said shaft carrying said friction roll for rotation, said bushing and friction roll cooperating to form a chamber between them adapted to contain lubricant and having spaced end walls, spring means in said chamber extending between said opposed walls urging said friction roll axially along said shaft and friction disk means carried upon said shaft against which said spring means urges said friction roll.

4. Idler roll training mechanism including in combination a shaft adapted to be carried stationarily upon a pivotally carried frame, an idler roll and a friction roll carried side by side upon said shaft, bearing means supporting said idler roll upon said shaft for free rotation, a bushing on said shaft carrying said friction roll for rotation, said bushing and friction roll cooperating to form a chamber between them, spring means in said chamber urging said friction roll axially along said shaft, and friction disc means carried upon said shaft against which said spring means urges said friction roll.

STANLEY M. MERCIER.

REFERENCES CITED

The following references are of record in the file of this patent:

UNITED STATES PATENTS

| Number | Name | Date |
|---|---|---|
| 1,192,128 | Sibley | July 25, 1916 |
| 1,572,555 | Nelson | Feb. 9, 1926 |
| 2,451,394 | Klein | Oct. 12, 1948 |